(12) United States Patent
Wang

(10) Patent No.: US 12,391,100 B1
(45) Date of Patent: Aug. 19, 2025

(54) WINDOW RAIN GUARD FOR VEHICLE

(71) Applicant: Chenchen Wang, Chuzhou (CN)

(72) Inventor: Chenchen Wang, Chuzhou (CN)

( * ) Notice: Subject to any disclaimer, the term of this patent is extended or adjusted under 35 U.S.C. 154(b) by 0 days.

(21) Appl. No.: 18/976,208

(22) Filed: Dec. 10, 2024

(51) Int. Cl.
*B60J 1/20* (2006.01)
*B60J 10/72* (2016.01)

(52) U.S. Cl.
CPC .............. *B60J 1/2002* (2013.01); *B60J 10/72* (2016.02)

(58) Field of Classification Search
CPC ... B60J 1/20; B60J 1/2002; B60J 3/005; B60J 10/72
USPC ...................................................... 296/1.07
See application file for complete search history.

(56) References Cited

U.S. PATENT DOCUMENTS

| | | | | |
|---|---|---|---|---|
| 4,331,359 A | * | 5/1982 | Sheldon | F41H 5/263 49/63 |
| 4,527,466 A | * | 7/1985 | Kossor | B60J 1/20 454/133 |
| 4,558,633 A | * | 12/1985 | Lingg | B60J 1/20 454/131 |
| 7,172,240 B1 | * | 2/2007 | Kaufman | B60J 1/2002 454/131 |
| 2011/0045757 A1 | * | 2/2011 | Szwed | B60J 1/20 454/131 |
| 2012/0205941 A1 | * | 8/2012 | Chou | B60J 3/005 296/152 |
| 2019/0210433 A1 | * | 7/2019 | Serentill | B60J 1/2002 |
| 2020/0130479 A1 | * | 4/2020 | Rose | B60J 1/2002 |

* cited by examiner

*Primary Examiner* — Jason S Daniels
(74) *Attorney, Agent, or Firm* — Ying-Ting Chen

(57) ABSTRACT

A window rain guard for a vehicle, wherein the vehicle includes a window and a resilient strip having a mounting groove, wherein the window rain guard includes a shield portion and a mounting portion extended from the shield portion for fitting into the mounting groove of the resilient strip, wherein the window rain guard has a proximate mounting side adjacent to the mounting portion and a distal end side which is opposite to the proximate mounting side and is adjacent to the shield portion, wherein the proximate mounting side is more flexible than the distal end side.

10 Claims, 16 Drawing Sheets

A

B

WINDOW RAIN GUARD FOR VEHICLE

BACKGROUND OF THE PRESENT INVENTION

Field of Invention

The present invention relates to a window guard, and more particularly to a window rain guard which is adapted to be mounted to a window frame groove of a vehicle.

Description of Related Arts

A window visor can prevent rain from entering the vehicle when a window is slightly open, allowing ventilation even during bad weather. It can also reduce the direct impact of strong wind on a passenger when the window is partially open, providing a more comfortable experience. The window visor allows fresh air to enter the vehicle without letting in rain, dust, or debris, and helps eliminate stale air, smoke, or other odors from the cabin, improving overall air quality. By enabling ventilation without using the air conditioning, visors can contribute to better fuel efficiency, particularly when parked or during mild weather. Some visors also serve as a sun shield, blocking direct sunlight from the side and providing a cooler cabin environment.

A conventional window visor on the market can be installed on the outside of the door frame of the vehicle by an adhesive tape. However, the adhesive tape can lose its strength due to exposure to weather conditions such as heat, rain, and cold, leading to the rain guard peeling off or detaching. If the adhesive loses its stickiness, reapplying or replacing it can be a tedious and frustrating process.

External rain guards are typically noticeable and may not blend seamlessly with the design of the vehicle. For many car owners, the bulky and protruding nature of external guards can make the car look less premium and more like a modified vehicle.

Being externally mounted, these rain guards are directly exposed, leading to discoloration, cracking, or warping over time. External guards can sometimes create wind noise at high speeds, reducing cabin comfort.

Furthermore, once installed, external rain guards are not easily removed without leaving adhesive marks or causing potential damage to the surface of the vehicle. In addition, when removed, the adhesive often leaves behind unsightly residue that is difficult to clean, affecting the car's aesthetics.

SUMMARY OF THE PRESENT INVENTION

The invention is advantageous in that it provides a window rain guard which is adapted to be mounted to a window frame groove of a vehicle, so that the installation is convention and reliable.

Another advantage of the present invention is to provide a window rain guard, stalling the window rain guard directly into the groove ensures a tight and secure fit, minimizing gaps where water, wind, and debris might enter. Accordingly, the window rain guard effectively channels rainwater away from the window and door seals, protecting the interior from moisture Another advantage of the present invention is to provide a window rain guard, wherein the window frame has a rubber groove which provides a natural anchoring point for the window rain guard, the groove installation hides much of the attachment mechanism, creating a clean and seamless look that complements the design of the vehicle.

Another advantage of the present invention is to provide a window rain guard, wherein the rubber strip helps hold the rain guard securely in place, even during high-speed driving or adverse weather conditions. The secure fit in the rubber groove minimizes vibration and wear over time, extending the life of the window rain guard.

Another advantage of the present invention is to provide a window rain guard, wherein the window rain guard integrates closely with the contours of the window, maintaining the aesthetic appeal of the vehicle.

Another advantage of the present invention is to provide a window rain guard, by designing the installation width of the window rain guard to match or slightly exceed the groove depth ensures that the rubber strip is not excessively narrowed, allowing smooth and unobstructed window movement.

Another advantage of the present invention is to provide a window rain guard, wherein proper depth calibration prevents interference between the window rain guard and the glass, reducing wear on the window.

Another advantage of the present invention is to provide a window rain guard, wherein the close alignment of the window rain guard with the rubber strip and window creates a streamlined profile that reduces wind noise at high speeds.

Another advantage of the present invention is to provide a window rain guard, wherein the rubber groove provides a natural guide for precise placement, streamlining the installation process, and the window rain guard can be removed and replaced without damaging the rubber strip or requiring extensive repairs.

Another advantage of the present invention is to provide a window rain guard, which function as an add-on structure on a window of the vehicle, using the existing rubber strip groove eliminates the need for complex installation methods, reducing production and installation costs.

Another advantage of the present invention is to provide a window rain guard which is mainly made of polycarbonate, polycarbonate's inherent flexibility allows the window rain guard to be bent during installation without cracking or breaking, enabling it to conform to the contours of the rubber groove and window frame. This is especially important for cars with curved window profiles. The bendability reduces the risk of damage during fitting and makes the process faster and more forgiving for installers.

Another advantage of the present invention is to provide a window rain guard, wherein in addition to weather protection, the window rain guard also can serve as a deflector for smoke, dust or light when the window is slightly open.

Additional advantages and features of the invention will become apparent from the description which follows, and may be realized by means of the instrumentalities and combinations particularly pointing out in the appended claims.

According to the present invention, the foregoing and other objects and advantages are attained by a. window rain guard for a vehicle, wherein the vehicle comprises a window and a resilient strip around the window, wherein the resilient strip has a mounting groove, wherein the window rain guard comprises:

a shield portion; and a mounting portion extended from the shield portion for fitting into the mounting groove of the resilient strip.

According to an embodiment, the shield portion is protruded from the mounting portion to define an accommodating groove having an access opening.

According to an embodiment, the mounting portion comprises a top mounting layer and two side mounting layers extended from two sides of the top mounting layers respectively.

According to an embodiment, the mounting portion has a thickness of 0.8 mm-1.2 mm.

According to an embodiment, the mounting portion has a gradually reducing thickness along a direction away from the shield portion.

According to an embodiment, each of the two side mounting layers has a depth larger than a depth of the top mounting layer.

According to an embodiment, the resilient strip comprises a top section and two side sections respectively extended from two sides of the top section, wherein a depth of the top mounting layer is 0 mm-0.5 mm deeper than a depth of the mounting groove in a top section of the resilient strip, a depth of each the side mounting layer is 0.5 mm-1 mm deeper than a depth of the mounting groove in each side section of the resilient strip.

According to an embodiment, the mounting portion has a thickness smaller than a thickness of the shield portion.

According to an embodiment, a thickness of the shield portion is 2.2 mm-2.5 mm.

According to an embodiment, the top mounting layer has one or more notches formed along a length thereof.

According to an embodiment, the window rain guard has a proximate mounting side and a distal end side which is opposite to the proximate mounting side, wherein the one or more notches is formed at the proximate mounting side, wherein the shield portion comprises a distal continual edge adjacent to the distal end side.

According to an embodiment, the shield portion comprises a distal continual edge adjacent to the access opening and a reinforcing rib which is integrally protruded from an inner side of the distal continual edge.

According to an embodiment, the shield portion comprises a reinforcing rib which is integrally protruded from an inner side of the distal continual edge.

According to an embodiment, a width of the reinforcing rib is 2.5 mm-3 mm, a thickness of the reinforcing rib is 1.3 mm-2.3 mm.

According to an embodiment, a width of the reinforcing rib is 2.5 mm-3 mm, a thickness of the reinforcing rib is 1.3 mm-2.3 mm, a thickness of the distal edge of the shield body is 2.2 mm-2.5 mm, a thickness of the mounting portion is 0.8 mm-1.2 mm.

According to an embodiment, the window rain guard has a proximate mounting side adjacent to the mounting portion and a distal end side which is opposite to the proximate mounting side and is adjacent to the shield portion, wherein the proximate mounting side is more flexible than the distal end side.

According to an embodiment, the mounting portion comprises a top mounting layer and two side mounting layers extended from two sides of the top mounting layers respectively, wherein the top mounting layer has one or more notches formed along a length thereof, wherein a thickness of the mounting portion is 0.8 mm-1.2 mm, a thickness of the shield portion is 2.2 mm-2.5 mm, a main material of the shield portion and the mounting portion is polycarbonate.

According to an embodiment, a transition portion between the top mounting layer and the side mounting layer comprises a rounded corner.

According to an embodiment, by weight ration, a material of the shield portion and the mounting portion comprises 50%-80% polycarbonate, 10%-30% flow modifier, and 5%-15% toughening agent.

According to an embodiment, the window rain guard is prepared by an injection molding process, wherein an injection pressure is 100 Mpa-300 Mpa, a heating temperature is 250° C.-350° C., a molding speed is 25 mm/s-100 mm/s, a cooling time is 50 s-100 s.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
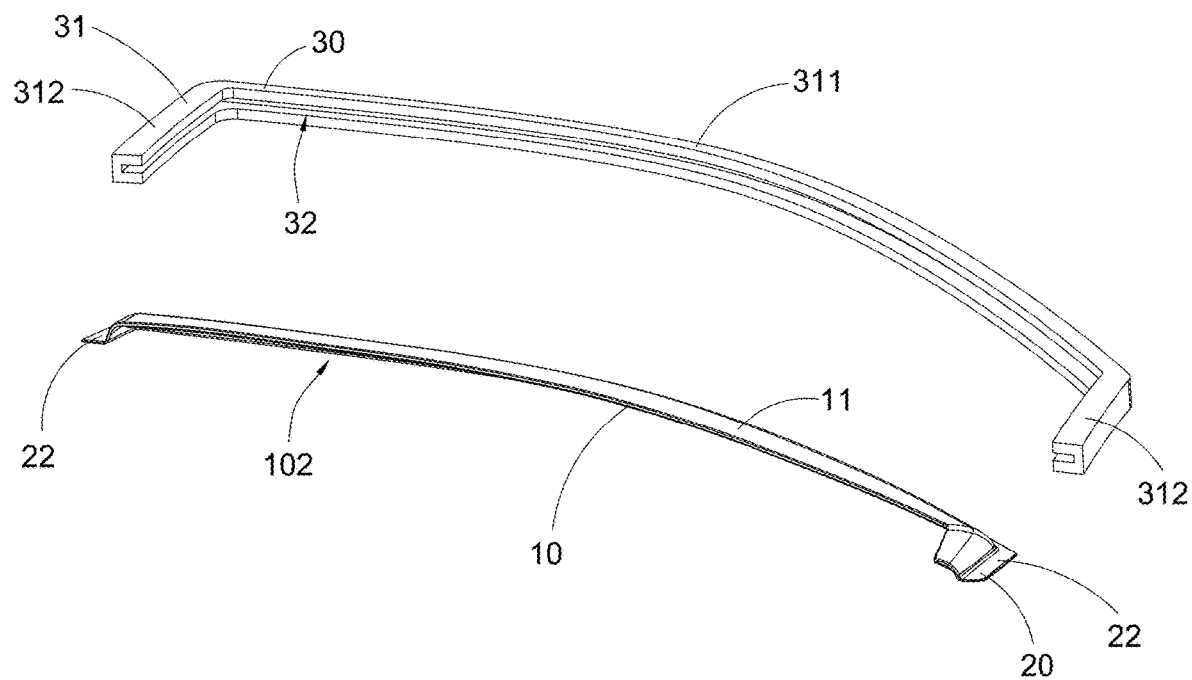
FIG. 1A is a perspective view of a window rain guard for mounting to resilient strip around a window of a vehicle according to a preferred embodiment of the present invention.
Figure 1B:
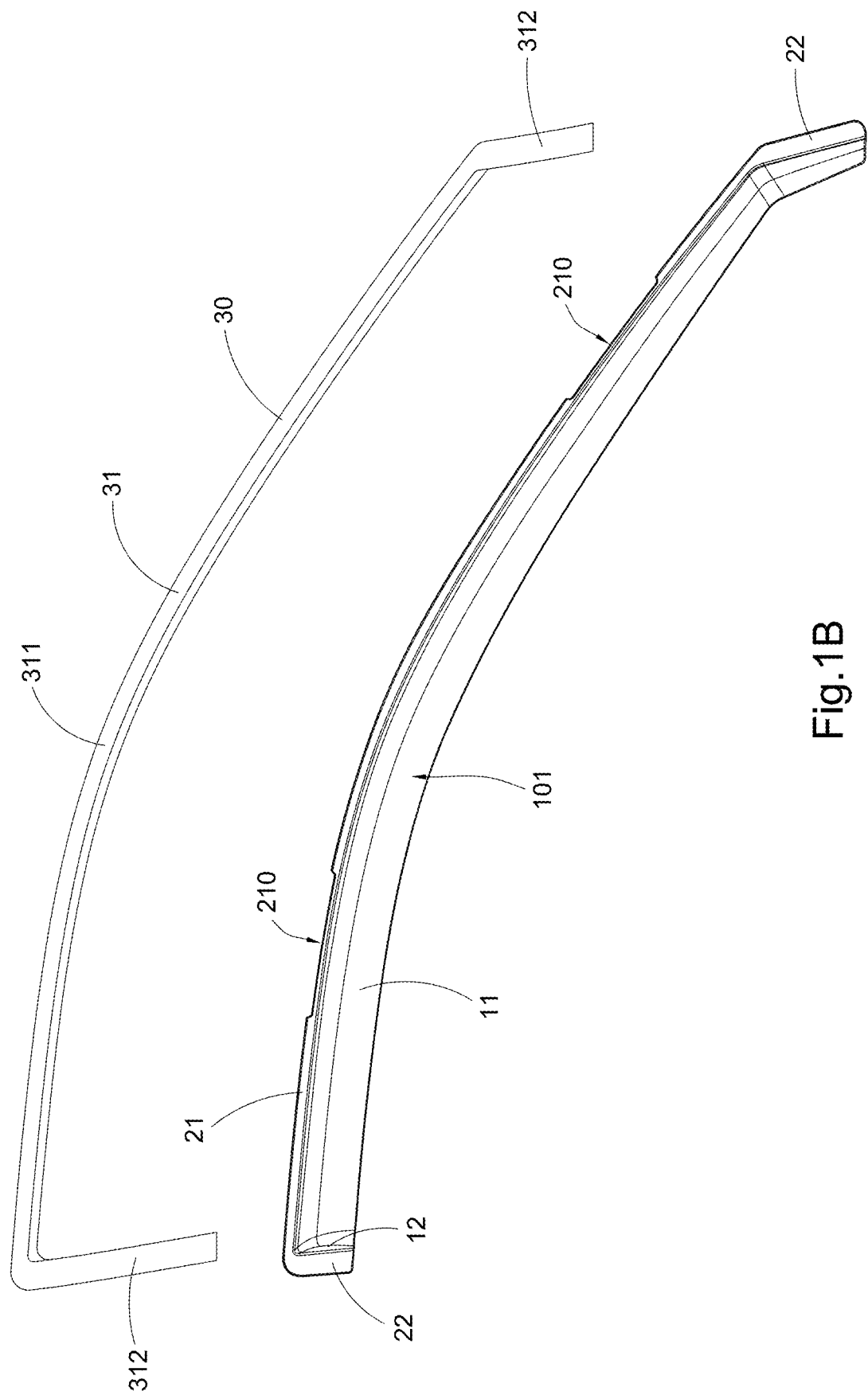
FIG. 1B is another perspective view of the window rain guard according to the above preferred embodiment of the present invention.
Figure 2:
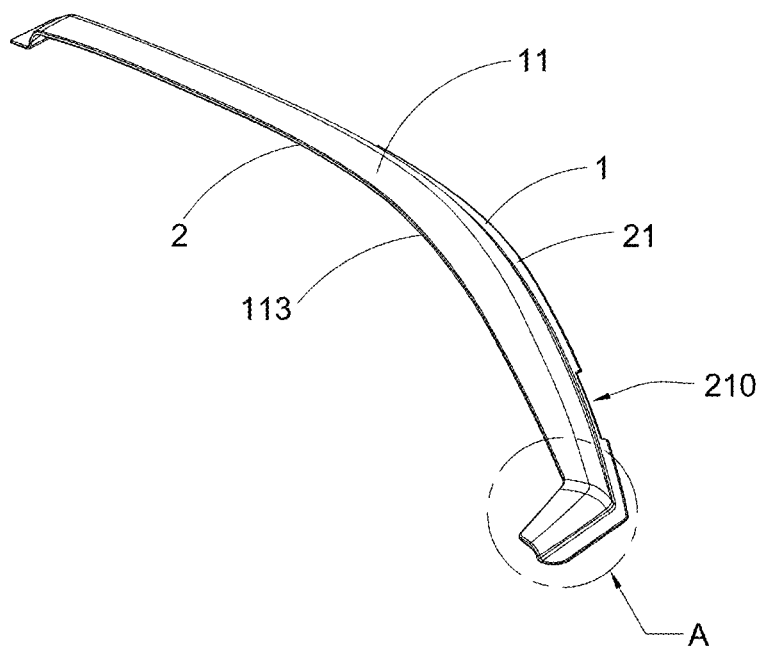
FIG. 2 is another perspective view of the window rain guard according to the above preferred embodiment of the present invention.
Figure 3:
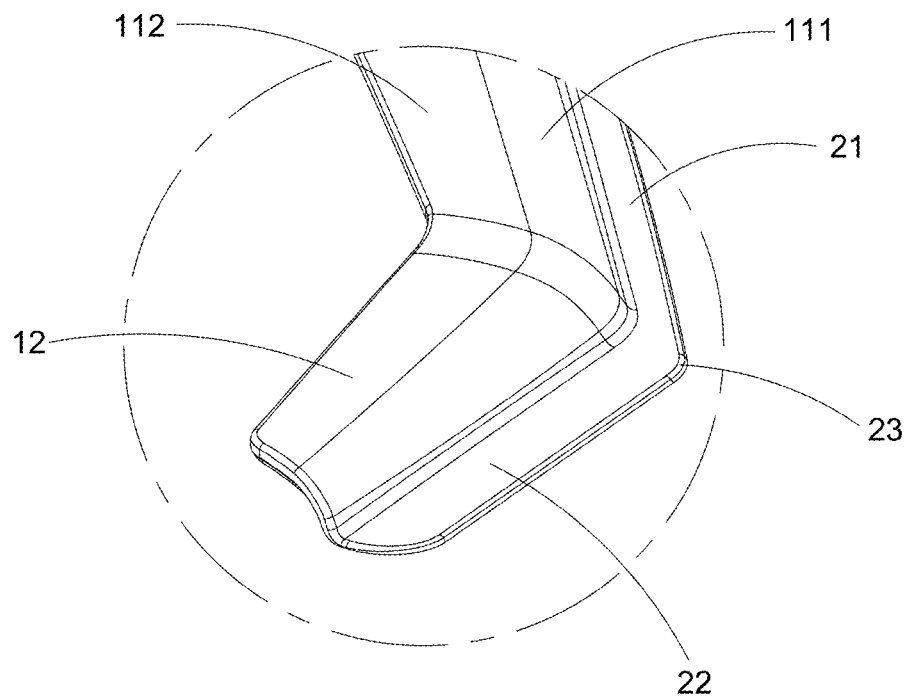
FIG. 3 is a partial enlarged view of area A of FIG. 2.
Figure 4:
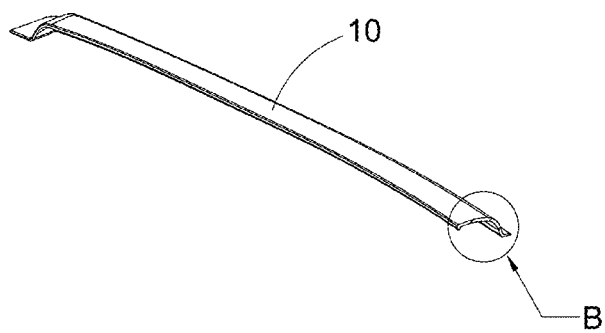
FIG. 4 is another perspective view of the window rain guard according to the above preferred embodiment of the present invention, wherein the window rain guard is cut along a cross section.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1A to FIG. 15 of the drawings, a window rain guard according to a preferred embodiment of the present invention is illustrated. The window rain guard comprises a shield portion 10 and a mounting portion 20 integrally extended from the shield portion 10 for mounting to a window frame 30 of a vehicle 40.

The window frame 30 comprises a resilient strip 31 having a mounting groove 32 for mounting a window 41 of the vehicle 40. The resilient strip 31 can be a rubber strip having a rubber groove along the length of the strip for mounting a peripheral edge 411 of the window 41 of the vehicle 40.

In this embodiment, the shield portion 10 is the primary functional component that extends outward from the window frame 30. The shield portion 10 serves to deflect rainwater, wind, and debris, preventing them from entering the vehicle 40 through the window 41.

When the shield portion 10 is made of a material that is transparent, it also provides sunshade capabilities when the window 41 is slightly open, ensuring improved ventilation without compromising protection.

The mounting portion 20 is designed to attach securely to the window frame 30 of the vehicle 40. Its design ensures a tight fit within the mounting groove 32 of the resilient strip 31, providing stability and preventing detachment even during vehicle operation at high speeds or in adverse weather conditions.

The window frame 30 comprises the resilient strip 31 which may be made of rubber or a similar elastic material. The resilient strip 31 compresses against the window 41, creating a sealed connection that prevents water infiltration and wind noise.

When the window 41 is in a closed state, the window 41 is securely mounted within the resilient strip 31, with its peripheral edge 411 fitted into the mounting groove 32. The mounting configuration ensures that the window rain guard integrates seamlessly with the window structure.

The integral mounting portion 20 simplifies installation by fitting directly into the mounting groove 32 of the resilient strip 31, eliminating the need for screws, or additional fasteners. The design leverages the elasticity of the resilient strip 31 to secure the window rain guard in place, making installation quick and user-friendly. The elastic properties of the resilient strip maintain the secure attachment of the window rain guard without wear or deformation over time.

By leveraging the existing mounting groove 32 of the resilient strip 31, the window rain guard integrates into the vehicle structure without requiring additional modifications or components. The sleek, integrated design of the window rain guard enhances the appearance of the vehicle 40, avoiding bulky or obtrusive components.

The design minimizes wind noise by ensuring a streamlined fit with the window frame 30, reducing turbulence during driving at high speeds. The secure seal between the mounting portion 20 and the resilient strip 31 also reduces external noise infiltration.

A precise fit of the mounting portion 20 within the mounting groove 32 is provided in the present invention, so as to ensure that the resilient strip 31 is not excessively compressed or deformed. This preserves the smooth operation of the window 41, preventing jamming or misalignment when raising or lowering the glass. A length of the mounting portion 20 is 1 mm-2 mm larger than a length of the mounting groove 32, so that the mounting portion 20 is in a tightened up state.

In addition, the mounting portion 20 of the window rain guard may be detachably mounted to the mounting groove 32, the detachable design allows for easy removal and replacement of the window rain guard if necessary, without damaging the rubber strip 31 of the window frame 30.

Figure 14:
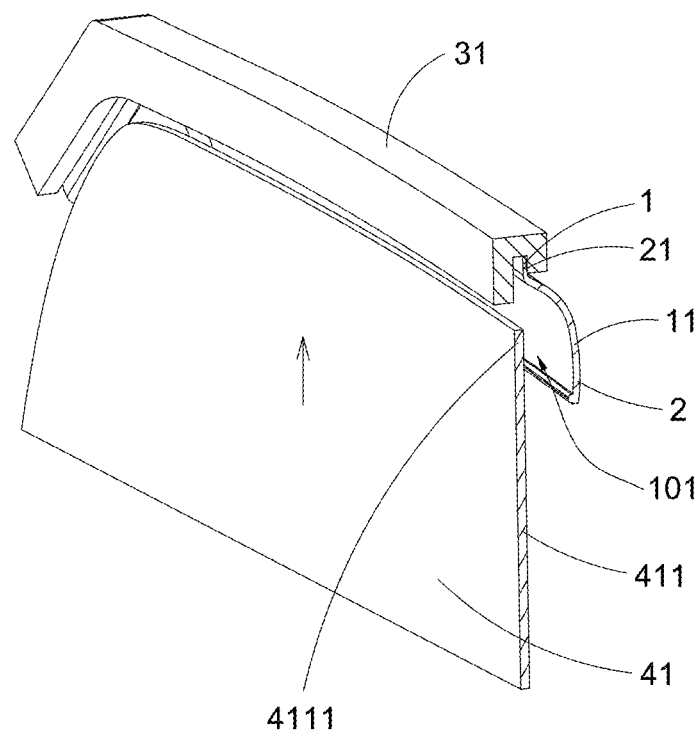
FIG. 14 is a perspective view illustrating the window rain guard which is fitted to the resilient strip of the vehicle according to the above preferred embodiment of the present invention, wherein the window can be in a slight open state for air circulation.

When the window 41 is in a slight open state, as shown in FIG. 14, in other words, the window 41 is slid down while the top edge 4111 leaves the resilient strip 31, a gap is defined between the top edge 4111 of the window 41 and the resilient strip 31 at an inner side of the shield portion 10, so that ventilation is allowed through the gap which is defined between the top edge 4111 of the window 41 and the resilient strip 31 while the shield portion 10 functions to deflect rainwater, wind, and debris. Accordingly, the shield portion 10 effectively deflects rainwater and debris away from the window 41, keeping the interior of the vehicle 40 dry and clean. The tight fit of the mounting portion 20 into the resilient strip 31 prevents water seepage through the mounting area, ensuring a robust seal.

In other words, the gap formed between the top edge 4111 of the window 41 and the resilient strip 31 allows for air circulation, enabling fresh air to enter the vehicle's interior without fully lowering the window 41. This is particularly beneficial in situations where full window opening may not be ideal, such as during light rain or in high-wind conditions. The gap created allows for safe and efficient ventilation without compromising on interior dryness. Passengers can enjoy fresh air circulation even in rainy or windy conditions, enhancing comfort and convenience. Drivers and passengers can partially open the window for ventilation without needing to worry about rainwater, wind, or debris entering.

The shield portion 10 extends outward and is strategically positioned to cover the gap. Its primary function is to deflect rainwater, wind, and debris away from the gap and into the external environment, preventing them from entering the vehicle 40. Even during driving at high speeds, the shield portion 10 ensures that external disturbances are minimized.

In this embodiment, the mounting portion 20 comprises a top mounting layer 21 and two side mounting layers 22 integrally extended from two sides of the top mounting layer 21, the shield portion 10 is extended between the top mounting layer 21 and the two mounting layers 22. Accordingly, the top mounting layer 21 and the two side mounting layers 22 are peripheral edges of the window rain guard, and the mounting portion 20 is surrounding the shield portion 10.

A transition portion 23 between the top mounting layer 21 and each side mounting layer 22 comprises a rounded corner. Accordingly, the rounded corner at the transition portion 23 facilitates a smooth installation of the window rain guard by minimizing any sharp edges or stress points at the junction of the top mounting layer 21 and the side mounting layers 22. This design feature ensures that the rain guard can be easily manipulated during installation, particularly when the mounting portion 20 needs to conform to the contours of the resilient strip 31 of the window frame 30. The rounded corner allows the user to bend or adjust the window rain guard without risking damage to the material, increasing the flexibility and ease of positioning during installation.

The top mounting layer 21 forms the uppermost edge of the mounting portion 20. It is designed to fit snugly into a top section 311 of the resilient strip 31 of the window frame 30 on the vehicle 40. This layer provides primary support for the window rain guard, distributing forces evenly across the top of the wind frame 30 to maintain stability and prevent displacement.

The two side mounting layers 22 are integrally extended from both sides of the top mounting layer 21 and are respectively designed to engage with the vertical side sections 312 of the resilient strip 31, enhancing the grip of the window rain guard and ensuring a tight fit along the sides of the window frame 30. Their placement provides additional structural support and resistance to lateral movement or detachment under external forces such as wind pressure.

The shield portion 10, which is positioned between the top mounting layer 21 and the two side mounting layers 22, forms the central functional component of the window rain guard. This configuration ensures that the shield portion 10 is seamlessly integrated into the mounting structure, providing a cohesive and aesthetically pleasing design.

The combination of the top mounting layer 21 and the two side mounting layers 22 ensures a multi-directional grip on the resilient strip 31. This design prevents the window rain guard from loosening or detaching under external stresses, such as wind or vibration during vehicle operation.

In this embodiment, the shield portion 10 is protruded from the mounting portion 20 and defines an accommodating groove 101 having an access opening 102, a top of the window 41 of the vehicle 40 is able to enter the accommodating groove 101 through the access opening 102 when the window 41 is in a closed state.

The accommodating groove 101 is a recessed feature within the shield portion 10, positioned to align with the top edge 4111 of the vehicle window 41. When the window 41 is in a closed state, the top edge 4111 of the window 41 slides into the accommodating groove 101, ensuring a secure fit and enhancing the seal between the window 41 and the window rain guard.

The accommodating groove 101 is dimensioned to allow smooth entry and exit of the window edge while maintaining sufficient contact to block rainwater, wind, and debris. The access opening 102 defines the entry point of the accommodating groove 101. Its width is designed to accommodate variations in window edge dimensions while preventing over-compression of the rubber strip 31, ensuring smooth window operation.

By protruding from the mounting portion 20, the shield portion 10 provides extended coverage over the window frame 30. This design enhances its deflection capabilities, effectively redirecting rainwater, wind, and debris away from the window 41 and the vehicle interior.

When the window 41 enters the accommodating groove 101, the close fit between the window edge 411 and the interior of the shield portion 10 ensures a strong barrier against rainwater and debris. The shield portion 10 prevents water or air from infiltrating into the accommodating groove 101 through the access opening 102, maintaining a dry and comfortable vehicle interior.

The protruding shield portion 10 extends coverage beyond the mounting area, ensuring that rainwater is deflected away from both the window 41 and the resilient strip 31. This reduces the risk of water pooling in the mounting groove 32, which could otherwise lead to corrosion or mold growth.

Figure 15:
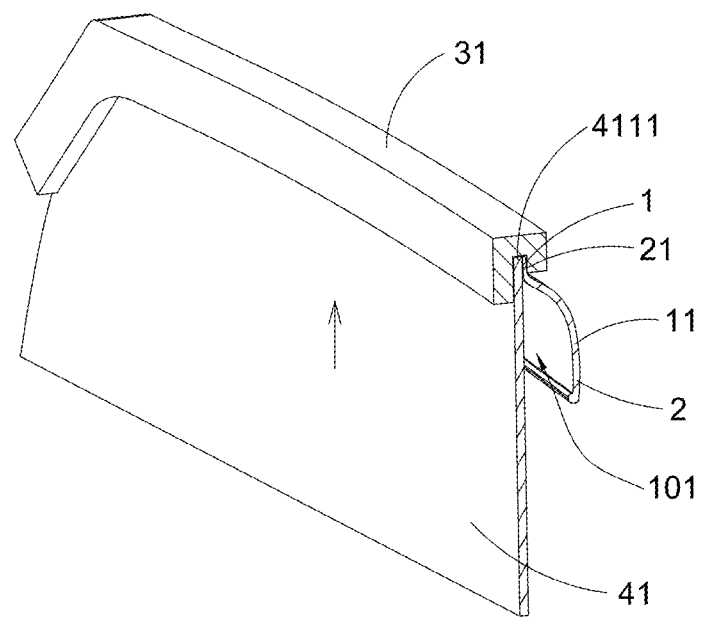
FIG. 15 is a perspective view illustrating the window rain guard which is fitted to the resilient strip of the vehicle according to the above preferred embodiment of the present invention, wherein the window can be shifted from a lower down state to a raised closed state.

The accommodating groove 101 and the access opening 102 are designed to work seamlessly with the movement of the window 41. When the window 41 is raised to a closed state, as shown in FIG. 15, it enters the accommodating groove 101 without resistance. When lowered, it exits smoothly, preventing damage to the rubber strip 31 or the window rain guard.

More specifically, in this embodiment, the shield portion 10 comprises a shield body 11 and two side portions 12. The shield body 11 is curvedly or inclinedly extended from the top mounting layer 21 of the mounting portion 20, the shield body 11 in this embodiment comprises an extension portion 111 and a body portion 112 is integral with the extension portion 111 to define a curved wall portion of the shield portion 10. The two side portions 12 are respectively curvedly or inclinedly extended between the side mounting layers 22 and the shield body 11. The accommodating groove 101 is formed between the shield body 11 and the two side portions 12.

The curved or inclined extension of the shield body 11 and side portions 12 directs rainwater, debris, and wind away from the window 41 and vehicle interior. The accommodating groove 101 ensures that no water seeps through the interface between the window 41 and the window rain guard.

The transition from the top mounting layer 21 to the shield body 11 via the extension portion 111 creates a smooth and aerodynamic profile, reducing drag and noise during driving. The design complements the exterior aesthetics of the vehicle 40, providing a sleek and professional appearance.

The integration of the body portion 112 and the two side portions 12 ensures that the shield portion 10 is rigid yet flexible enough to withstand external forces such as wind pressure or vehicle vibrations. The curved wall design of the body portion 112 adds strength without compromising the lightweight nature of the window rain guard.

The accommodating groove 101, formed between the shield body 11 and the side portions 12, provides a dedicated space for the top edge 4111 of the window 41. This ensures a snug and secure fit, minimizing movement and preventing damage to the window 41 or rubber strip 31.

The curved or inclined extensions of the shield body 11 and the two side portions 12 simplify alignment during installation, ensuring that the window rain guard conforms naturally to the contours of the window frame 30.

The curved design of the shield body 11 and the two side portions 12 is configured to reduce air turbulence around the window frame 30, enhancing the overall aerodynamic performance of the vehicle 40.

The shield body 11, which provides an enough coverage area, is combined with the side portions 12 to ensure comprehensive deflection of rainwater and debris from multiple angles, protecting the window and surrounding areas.

In this embodiment, the shield portion 10 and the mounting portion 20 of the window rain guard is mainly made of polycarbonate which is resilient and highly resistant to impact, making the window rain guard durable against minor collisions, road debris, or accidental pressure during cleaning and maintenance. It can maintain strength in extreme temperatures, whether hot or cold, ensuring reliability in diverse climates. The material's resilience ensures the rain guard remains functional and visually appealing over the vehicle's lifetime. Polycarbonate also can be manufactured with a sleek, glossy, or tinted appearance, enhancing the car's aesthetics.

Particularly, polycarbonate allows the window rain guard to have a lightweight and thin profile while maintaining sufficient mechanical strength. The excellent flowability of the polycarbonate material in injection molding allows for precise shaping of the window rain guard, including complex curves and contours for a perfect fit in the mounting groove 32. The edges of the mounting portion 20 can be finely designed to ensure smooth contact with the wall of the mounting groove 32, preventing damage to the resilient strip 31 during installation.

Furthermore, unlike metals, polycarbonate is immune to corrosion, ensuring long-term performance even in humid or rainy environments. It is resistant to cleaning agents, oils, and other automotive chemicals, ensuring the material does not degrade over time.

During installation, polycarbonate does not shatter or create sharp fragments upon impact, enhancing safety for both the vehicle 40 and the installer.

By weight ratio, the window rain guard comprises 50%-80% polycarbonate, 10%-30% flow modifier, and 5%-15% toughening agent. As a typical example, the window rain guard comprises 70% polycarbonate, 20% flow modifier, and 10% toughening agent. The flow modifier can be but not limited to thermoplastic elastomer, silicone rubber, polyurethane, polytetrafluoroethylene, acrylic, polyvinylidene fluoride. The toughening agent can be but not limited to acrylonitrile butadiene styrene, nitrile rubber, thermoplastic polyurethane, polyethylene terephthalate, polybutylene terephthalate, polyolefin elastomer, and epoxy-based modifier.

The flow modifier enhances the flowability of the polycarbonate during the injection molding process, ensuring even distribution of material within the mold. It reduces internal stresses and defects such as warping or incomplete filling, and facilitates the creation of intricate features, such as the accommodating groove 101 and curved wall portions, ensuring precise molding of the window rain guard.

The toughening agent improves the resilience and flexibility of the mixed material of the widow rain guard, preventing cracks or fractures under mechanical stress. It enhances the overall durability of the window rain guard, allowing it to maintain structural integrity despite repeated use and environmental exposure. It also increases the ability to absorb and dissipate impact energy, such as from small debris striking the shield portion 10 during driving.

In this embodiment, the window rain guard comprises a proximate mounting side 1 adjacent to the top mounting layer 21 of the mounting portion 20 and a distal end side 2 adjacent to a peripheral edge of the shield body 11 of the shield portion 10. In the design of the window rain guard, the proximate mounting side 1 of the window rain guard is intentionally made to have lower strength and increased flexibility compared to the opposite distal end side 2. This design choice is strategically implemented to facilitate the installation process by making it easier to bend the window rain guard and insert the top mounting layer 21 into the mounting groove 32 of the resilient strip 31. The structural and material properties of the window rain guard are tailored to ensure ease of installation while maintaining overall strength and performance.

In this embodiment, the top mounting layer 21, which has a smaller thickness than the shield body 11, has one or more notches 210 formed along the length thereof, the shield body 11 comprises a distal continual edge 113 which is not provided with notches 310, so that the proximate mounting side 1 of the window rain guard is specifically designed to be more flexible and less rigid than the opposite distal end side 2.

This flexibility allows the user to bend the window rain guard easily at the proximate mounting side 1 during installation, enabling the top mounting layer 21 to conform to the shape and dimensions of the mounting groove 32 in the resilient strip 31 without exerting excessive force. The reduced strength of the installation side ensures that it can be manipulated and positioned with minimal resistance, allowing for an easier and faster installation process.

Accordingly, the notches 210 are strategically formed along the length of the top mounting layer 21. These notches 210 serve to reduce the rigidity of the proximate mounting side 1, making it more flexible and easier to bend during installation. The notches 210 create localized points of flexibility along the top mounting layer 21, facilitating the bending process without compromising the overall structural integrity of the window rain guard.

Figure 6:
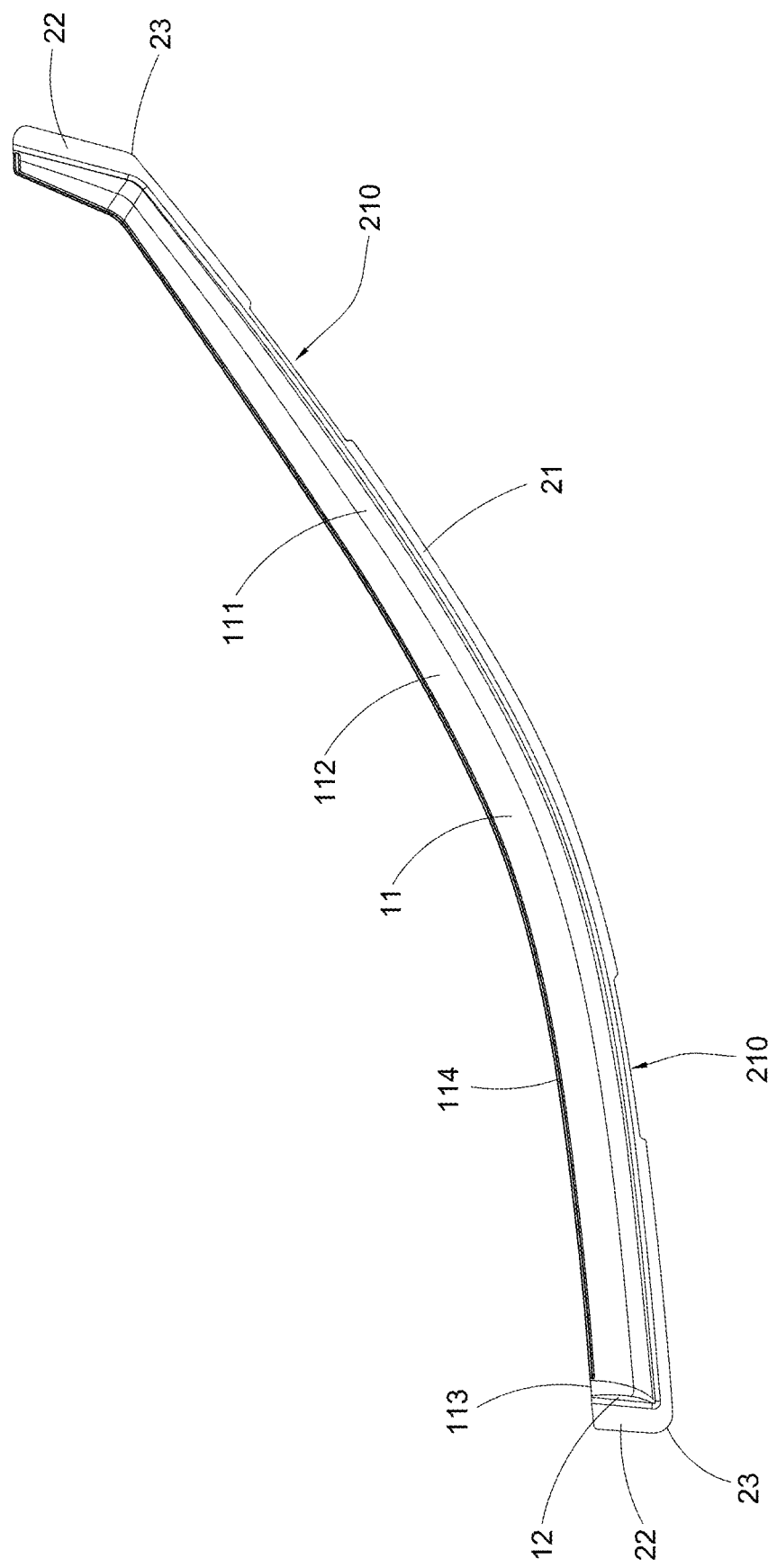
FIG. 6 is a top perspective view of the window rain guard according to the above preferred embodiment of the present invention.
Figure 7:
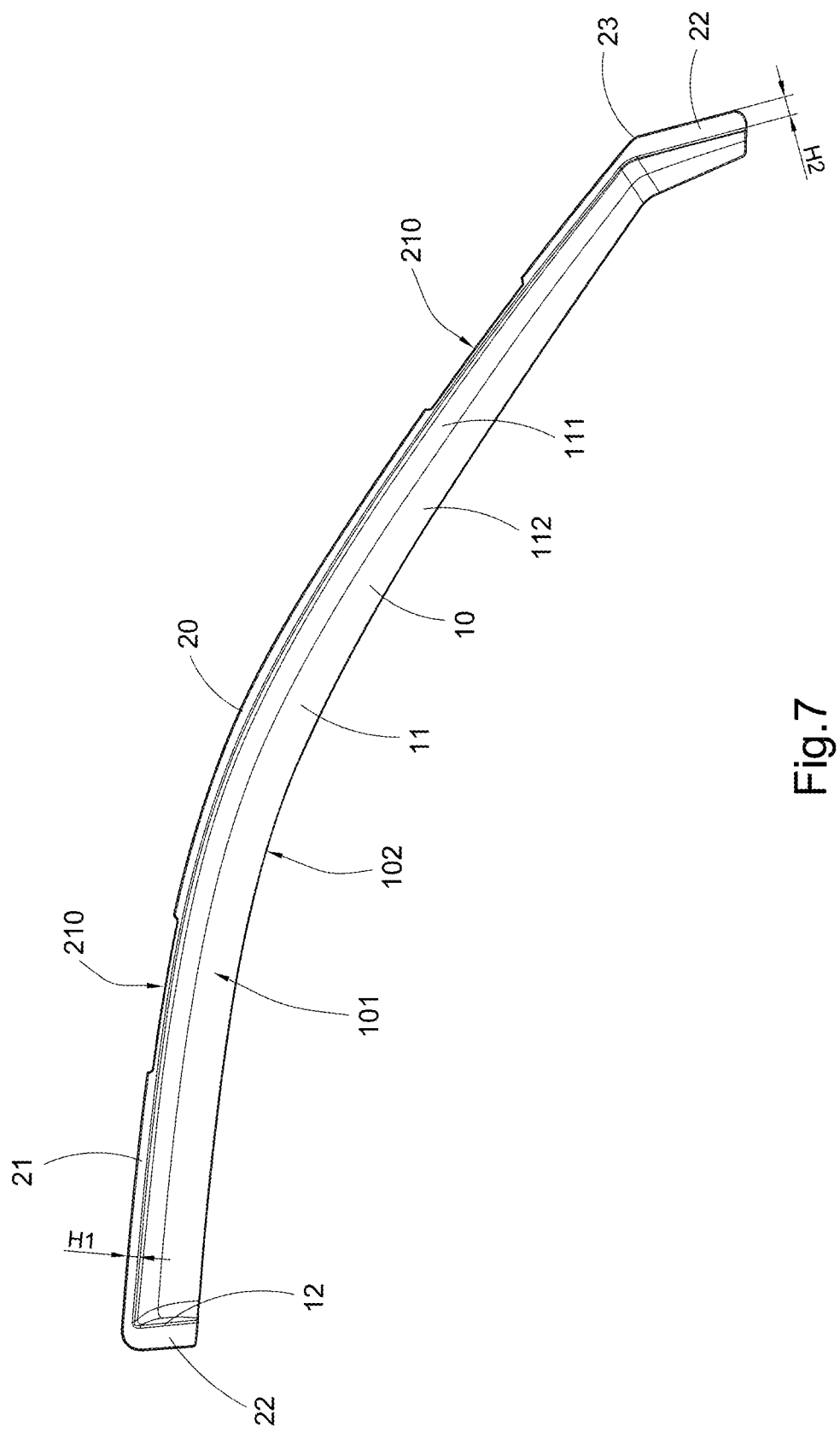
FIG. 7 is a bottom perspective view of the window rain guard according to the above preferred embodiment of the present invention.

One central notch 210 may be provided at a central area of the top mounting layer 21, or two or more notches 210 can be distributed along the length of the top mounting layer 21. As shown in FIGS. 6 and 7 of the drawings, in this embodiment, two notches 210 are symmetrically provided at the top mounting layer 21.

The distal continual edge 113 of the shield body 11, which lacks notches, remains rigid and structurally strong. This rigidity ensures that the opposite end of the window rain guard retains its shape and provides a secure fit once the top mounting layer 21 of the window rain guard is inserted into the mounting groove 32.

The absence of notches in the area of the distal continual edge 113 of the shield body 11 contributes to the overall structural integrity and protective function of the window rain guard, as it resists deformation under stress and effectively deflects rainwater and debris.

Particularly, the shield body 11 further comprises a reinforcing rib 114 which is extended and protruded at an inner side of the distal continual edge 113 along the length of the shield body 11, so that the strength of the distal end side 2 is further enhanced. Accordingly, this reinforcing rib 114 is preferred to run the entire length of the shield body 11 on the inner side of the distal edge 113, so as to further enhance the strength and structural integrity of the distal end side 2 of the window rain guard. By integrating this reinforcing rib 114, the overall rigidity and resistance to deformation at the distal ends die 2 are significantly improved, ensuring that the window rain guard performs its function of deflecting rainwater, debris, and wind effectively, even under high-stress condition.

Figure 5:
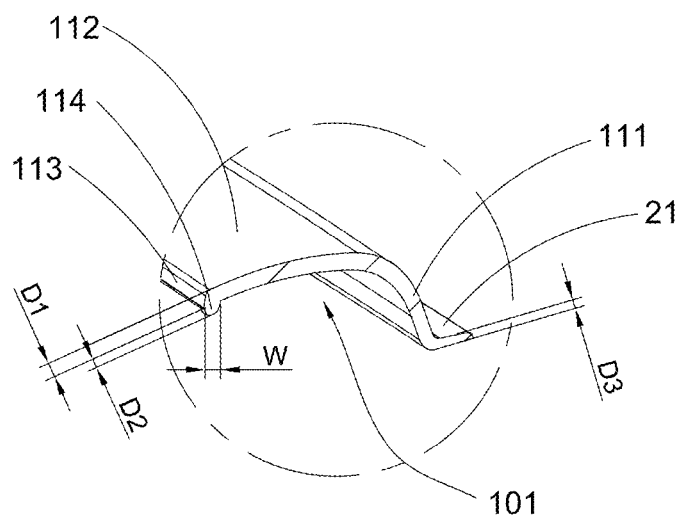
FIG. 5 is a partial enlarged view of area B of FIG. 4.

As s typical example, as shown in FIG. 5, a width W of the reinforcing rib 114 is preferred to be 2.5 mm-3 mm, a thickness D1 of the distal edge 113 of the shield body 11 is 2.2 mm-2.5 mm, a thickness D2 of the reinforcing rib 114 is preferred to be 1.3 mm-2.3 mm. A thickness D3 of the the top mounting layer 21 is 0.8 mm-1.2 mm, which is smaller than thickness D1 of the distal edge 113 of the shield body 11.

In the present invention, the reinforcing rib 114 is an additional structural feature that runs along the inner side of the distal continual edge 113. This rib is designed to enhance the strength of the distal end side 2 of the window rain guard, which is the side that remains rigid and does not feature notches for flexibility. The reinforcing rib 114 reinforces the shield body 11 without adding significant weight or compromising the aerodynamic properties of the window rain guard, making it more resistant to bending or deformation during use. Accordingly, the distal continual edge 113 of the shield body 11 is designed to remain rigid and structurally strong, and the addition of the reinforcing rib 114 further bolsters its ability to resist flexing or warping under external forces such as wind, rain, or debris impact.

The distal continual edge 113 is critical for the ability of the window rain guard to deflect external elements away from the vehicle window, and its strength is crucial for the long-term durability of the window rain guard.

More specifically, the reinforcing rib 114 improves the strength and rigidity of the distal end side 2 of the window rain guard. This reinforcement helps the window rain guard maintain its shape, ensuring that the distal edge does not flex or bend during high-speed driving, heavy rainfall, or when exposed to external forces like wind or debris. The reinforcing rib 114 provides additional support to the shield body 11, preventing the window rain guard from losing its deflecting function over time due to wear or deformation. Particularly, the reinforcing rib 114 helps distribute the stress along the distal edge more evenly, preventing localized points of failure. This even stress distribution reduces the likelihood of material fatigue or cracking, ensuring that the window rain guard continues to provide a reliable seal and deflection function for the vehicle window over time.

The reinforcing rib 114 ensures that the distal end side 2 maintains its ability to effectively deflect rainwater, wind, and debris away from the window 41 and the vehicle 40. The design prevents any deformation that could cause turbulence or airflow disruptions. The additional strength prevents the window rain guard from warping or collapsing under pressure, ensuring that it performs optimally throughout its lifetime. The reinforced distal continual edge 113 contributes to the overall durability of the window rain guard, reducing the likelihood of cracking or damage due to external stress or impacts.

The structural reinforcement provided by the reinforcing rib 114 also enhances the aerodynamic properties of the window rain guard. By maintaining the rigidity of the distal continual edge 113, the window rain guard ensures consistent airflow around the window 41, minimizing drag and improving the overall aerodynamics of the window structure.

It is thus can be seen that the proximate mounting side 1 of the window rain guard is specifically designed to be more flexible and less rigid than the distal end side 2. This is achieved through the incorporation of notches 210 along the top mounting layer 21, the incorporation of the reinforcing rib 114 at the distal end side 2, and the overall material properties. The flexibility of this installation side allows for easier bending during installation, enabling the window rain guard to conform to the shape and dimensions of the mounting groove 32 without excessive force. The opposite distal end side 2 of the window rain guard is more likely to maintain higher strength and rigidity, which ensures that once the window rain guard is inserted into the groove, it stays securely in place.

The flexibility of the proximate mounting side 1 allows the window rain guard to be bent slightly to facilitate easier insertion into the mounting groove 32 of the rubber resilient strip 31. This reduces the effort required to install the window rain guard, minimizing the risk of damage to the window rain guard or the rubber resilient strip 31 during installation. The user does not need to apply excessive force to insert the mounting portion 20 of the window rain guard, resulting in a more user-friendly installation process.

Despite the flexibility of the proximate mounting side 1, the overall durability of the window rain guard is maintained by ensuring that the opposite distal end side 2 retains high strength. This ensures that the window rain guard does not lose its protective capabilities after installation. It can continue to withstand the mechanical stresses and environmental factors it is exposed to during use, such as wind, rain, and debris impact.

The ability to bend the window rain guard for easier insertion allows the product to adapt to slight variations in the groove dimensions of different vehicle models. This flexibility provides a more versatile fit across a range of vehicles without compromising the sealing capabilities of the window rain guard.

During installation, an adhesive can be applied on at least one side of the mounting portion 20, and then the window rain guard is bent to allow the mounting portion 20 to be inserted into the mounting groove 32 of the resilient strip 31 on the vehicle 40, the distal end side 2 with a more strong strength will allow the window rain guard to return to its original shape once the mounting portion 20 is placed in position within the mounting groove 32 of the resilient strip 31, as shown in FIGS. 10A to 10D.

In this embodiment, the window rain guard can be tailored for different vehicle models by adjusting the dimensions and curvature of the shield portion 10 and the mounting portion 20 to match the specific window frame 30 and the rubber resilient strip 31 designs.

More specifically, when designing the window rain guard for the vehicle 40, the method comprises a step of obtaining the information of the window frame 30 around the window 41 of the vehicle 40 and a step of designing the mounting portion 20 and the shield portion 10 of the window rain guard.

More specially, in the step of obtaining the information of the window frame 30 around the window 41 of the vehicle 40, scan the relevant positions of the actual vehicle 40 to obtain triangulated surface data of the window position. Using the scanned triangulated surface data, reverse modeling is performed to determine the structural shape of the area on the window 41 where the window rain guard will be installed.

As an example, analysis shows that the inner mounting groove 32 of the resilient strip 31 has a width of 4.5 mm, while the glass thickness is 5 mm. In practice, when the window regulator is activated to raise the window 41 to its highest position, the glass window 41 compresses the resilient strip 31, causing it to expand outward and insert into the mounting groove 32, achieving a sealing effect.

Additionally, the window rain guard must maintain sufficient mechanical strength while also considering the flowability and filling performance of the material during the injection molding process. The thickness of the mounting portion 20 of the present invention is controlled between 0.8 mm-1.2 mm which will also allow the smooth movement of the window 41.

Figure 8:
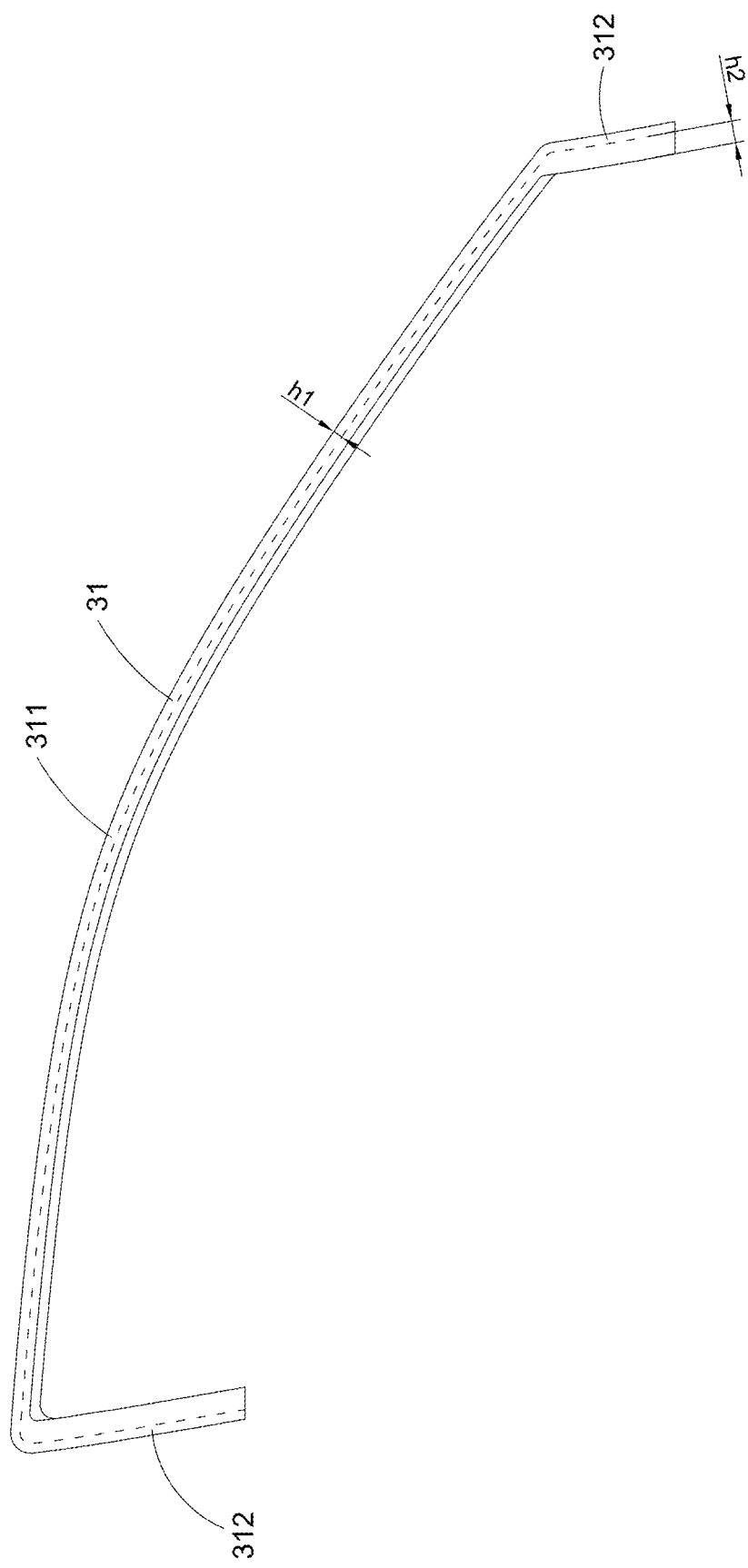
FIG. 8 is a schematic view of the resilient strip according to the above preferred embodiment of the present invention.
Figure 9:
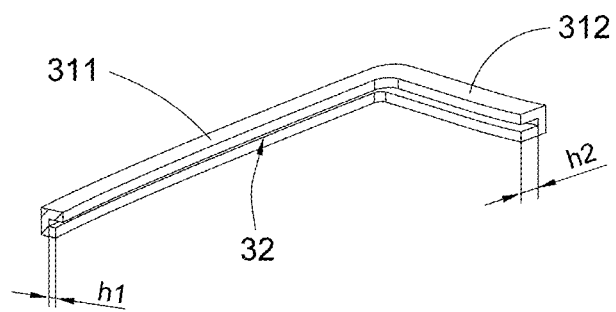
FIG. 9 is a perspective view of the resilient strip according to the above preferred embodiment of the present invention, wherein the resilient strip is cut through a cross section of a top section.
Figure 10A:
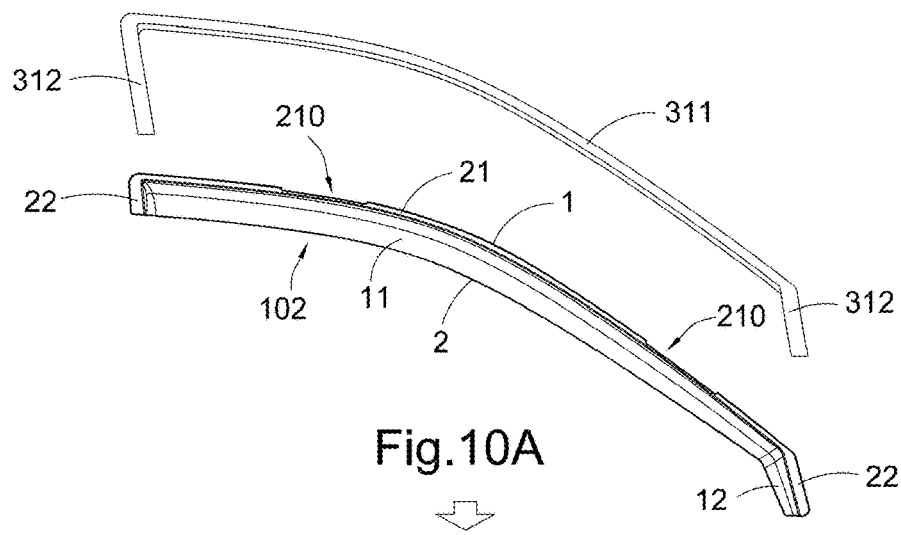
FIGS. 10A, 10B, 10C and 10D are perspective views illustrating a process for mounting the window rain guard to the resilient strip according to the above preferred embodiment of the present invention.
Figure 10B:
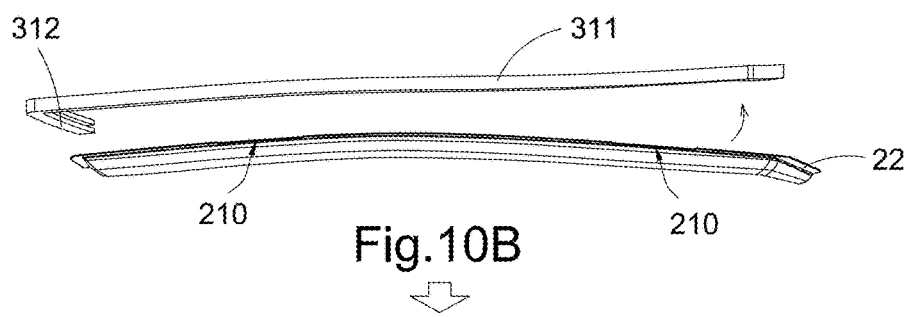
Figure 10C:
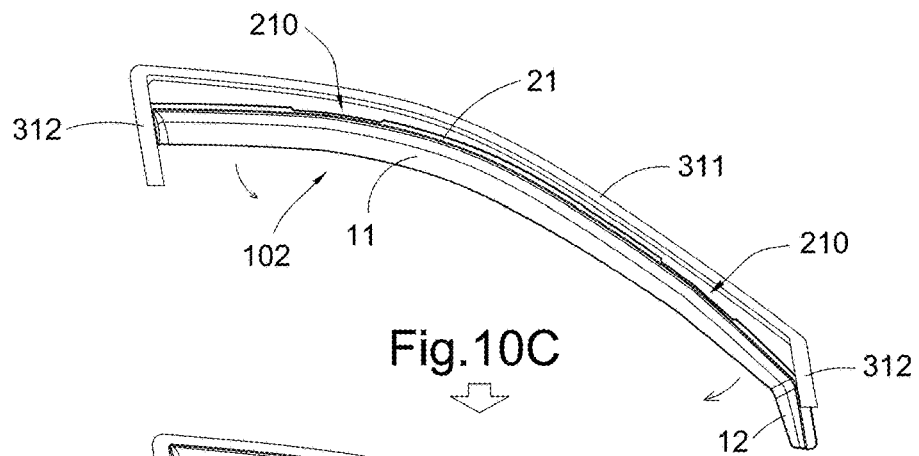
Figure 10D:
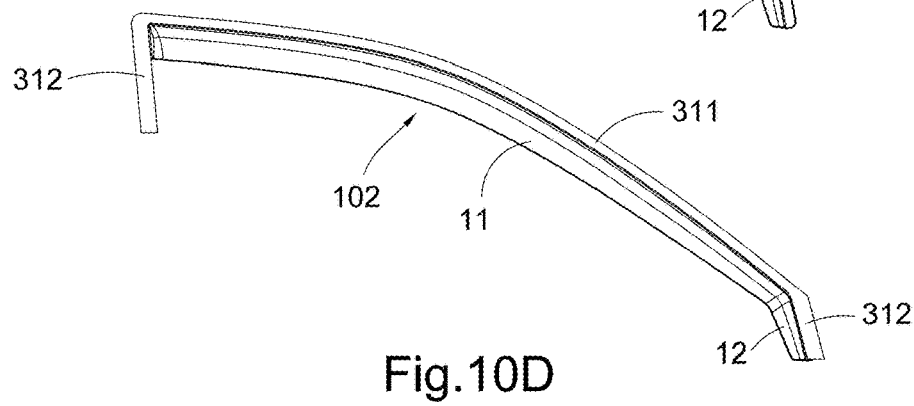
Figure 11:
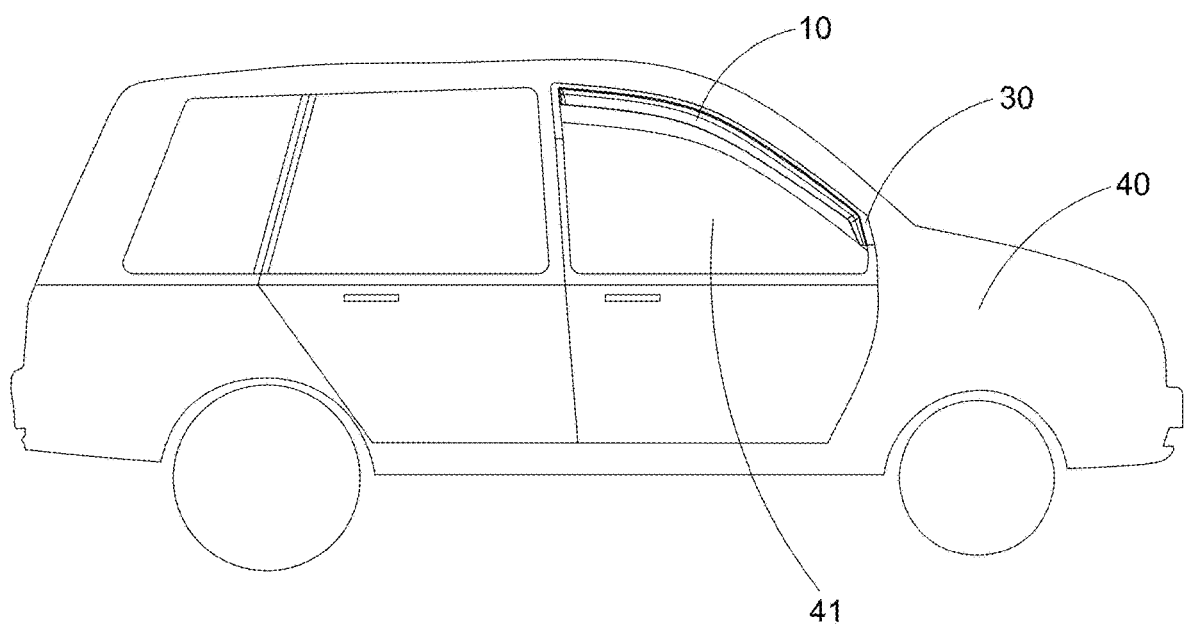
FIG. 11 is a perspective view illustrating the window rain guard which is mounted to a vehicle according to the above preferred embodiment of the present invention.
Figure 12:
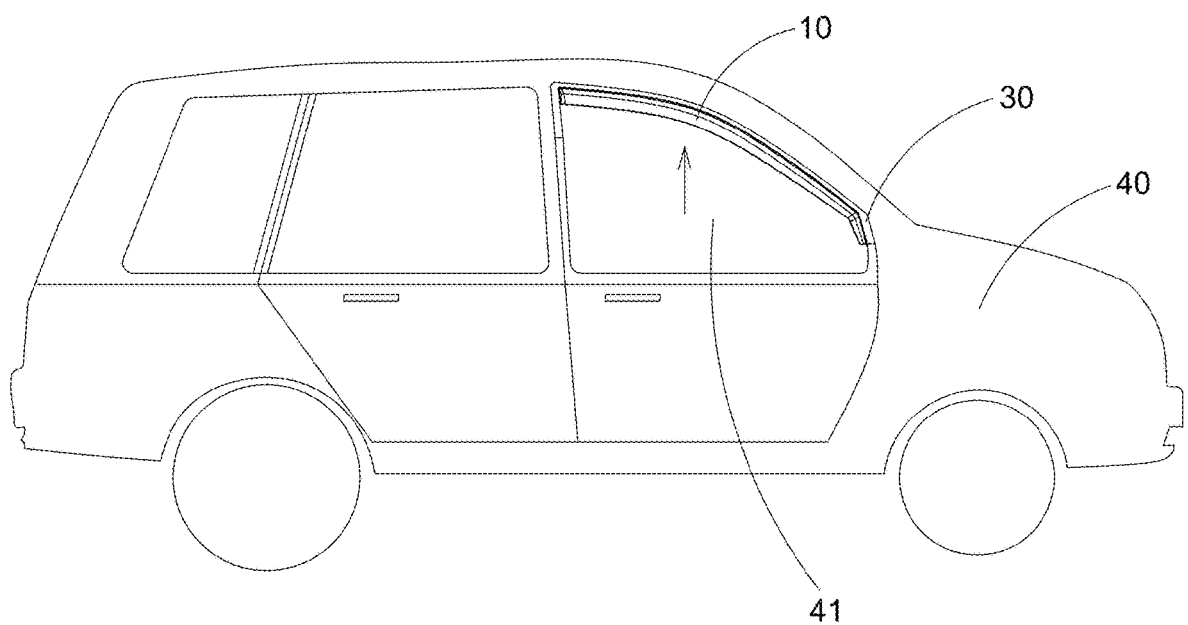
FIG. 12 is a perspective view illustrating the window rain guard which is mounted to the vehicle according to the above preferred embodiment of the present invention, wherein a window is in a raised state.
Figure 13:
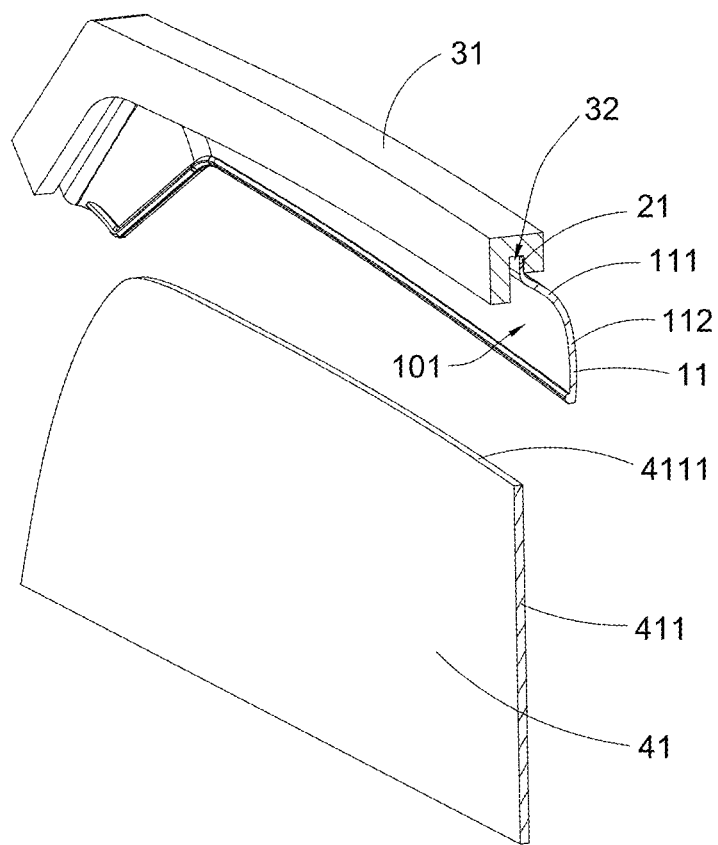
FIG. 13 is a perspective views illustrating the window rain guard which is fitted to the resilient strip of the vehicle according to the above preferred embodiment of the present invention, wherein the window is in an open state.

As shown in FIG. 8 and FIG. 9, the analysis also obtains a depth h1 of the mounting groove 32 in the top section 311 of the resilient strip 31 and a depth h2 of the mounting groove 32 in each of the two side sections 312 of the resilient strip 31. As an example, the depth h1 of the mounting groove 21 in the top section 311 of the resilient strip 31 is 6 mm, and the depth h2 of each mounting groove 32 in the two side sections 312 of the resilient strip 31 is 16 mm which is larger than the depth h1 of the mounting groove 32 in the top section 311 of the resilient strip 31.

Based on this, the depth of the mounting portion 20 of the window rain guard is designed. More specifically, in the present invention, a depth H1 of the top mounting layer 21 of the mounting portion 20 of the window rain guard is 0 mm-0.5 mm deeper than the depth h1 of the mounting groove 32 in the top section 311 of the resilient strip 31, a depth H2 of each side mounting layer 22 of the mounting portion 20 of the window rain guard is 0.5 mm-1 mm deeper than the depth h2 of the mounting groove 32 in each corresponding side section 312 of the resilient strip 31.

Accordingly, in this example, as shown in FIG. 7, the depth H1 of the top mounting layer 21 of the mounting portion 20 of the window rain guard is 6 mm-6.5 mm, depth H2 of each side mounting layer 22 of the mounting portion 20 of the window rain guard is 16.5 mm-17 mm.

This ensures ease of installation, prevents the inner mounting groove 32 of the resilient strip 31 from narrowing excessively after installation (which could affect smooth glass movement), and avoids jamming.

According to the present invention, the depth configuration ensures that the window rain guard can be easily inserted into the resilient strip groove without excessive force, ensuring a tight seal without causing deformation of the resilient strip 31. This depth design ensures that the resilient strip 31 does not become overly compressed after installation of the window rain guard, which could lead to issues with the movement of the window 41, such as jamming or resistance.

The precise depth control allows the window rain guard to conform to various vehicles, accommodating slight variations in window frame and resilient strip dimensions while still ensuring a tight fit and effective performance.

In addition, as shown in FIG. 5 of the drawings, the mounting portion 20 further has a gradually reducing thickness from a direction toward the proximate mounting side 1 away from the distal end side 2. For example, the proximate edge of the mounting portion 20 has a thickness of 0.8 mm, the distal edge of the mounting portion 20 adjacent to the shield portion 10 has a thickness of 1.2 mm.

The thinner proximate edge of the mounting portion 20 increases the flexibility of the window rain guard during installation, making it easier to bend and maneuver the window rain guard into the mounting groove 32 of the resilient strip 31. This allows for a simplified installation process where the user can easily position the window rain guard without needing excessive force or complicated steps.

The gradual reduction in thickness ensures that the user can bend the window rain guard precisely where it is needed without worrying about snapping or damaging the material.

The thicker distal edge near the shield portion 10 provides additional strength and rigidity, this helps the mounting portion 20 of the window rain guard to maintain its structural integrity over time, ensuring it remains securely attached to the window frame.

The gradual tapering allows the mounting portion 20 of the window rain guard to transition smoothly between a more flexible and a more rigid region, improving its overall fit and the ease with which it can be inserted and secured in place.

The thicker distal edge contributes to the strength and sealing performance of the the mounting portion 20 of the window rain guard. By having this added thickness at the point where the mounting portion 20 interacts most closely with the shield portion 10, it helps create a robust seal between the shield portion 10 and the window frame 30, preventing water ingress and ensuring the durability of the seal over time.

The gradual change in thickness may also aid in the injection molding process. As the mounting portion 20 tapers from thick to thin, it ensures more uniform material distribution and better flowability during manufacturing. This reduces the risk of defects or flow inconsistencies that could occur if the mounting portion had a uniform thickness throughout.

In addition, the window rain guard of the present invention is prepared by a molding process by a molding material. As described above, by weight ratio, the molding material of the window rain guard may comprises 50%-80% polycarbonate, 10%-30% flow modifier, and 5%-15% toughening agent. The flow modifier can be but not limited to thermoplastic elastomer, silicone rubber, polyurethane, polytetrafluoroethylene, acrylic, polyvinylidene fluoride. The toughening agent can be but not limited to acrylonitrile butadiene styrene, nitrile rubber, thermoplastic polyurethane, polyethylene terephthalate, polybutylene terephthalate, polyolefin elastomer, and epoxy-based modifier.

During the injection molding process, an injection pressure is 100 Mpa-300 Mpa such as 125 Mpa, a heating temperature is 250° C.-350° C., such as 300° C. A molding speed is 25 mm/s-100 mm/s, such as 50 mm. A cooling time is 50 s-100 s, such as 80 s.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A window rain guard for a vehicle, wherein the vehicle comprises a window and a resilient strip around the window, wherein the resilient strip has a mounting groove, wherein the window rain guard comprises:
   a shield portion; and
   a mounting portion extended from said shield portion for fitting into the mounting groove of the resilient strip;
   wherein said shield portion is protruded from said mounting portion to define an accommodating groove having an access opening;
   wherein said mounting portion comprises a top mounting layer and two side mounting layers extended from two sides of said top mounting layers respectively;
   wherein each of said two side mounting layers has a depth larger than a depth of said top mounting layer.

2. A window rain guard for a vehicle, wherein the vehicle comprises a window and a resilient strip around the window, wherein the resilient strip has a mounting groove, wherein the window rain guard comprises:
   a shield portion; and
   a mounting portion extended from said shield portion for fitting into the mounting groove of the resilient strip;
   wherein said shield portion is protruded from said mounting portion to define an accommodating groove having an access opening;

wherein said mounting portion comprises a top mounting layer and two side mounting layers extended from two sides of said top mounting layers respectively;

wherein the resilient strip comprises a top section and two side sections respectively extended from two sides of the top section, wherein a depth of said top mounting layer is 0 mm-0.5 mm deeper than a depth of the mounting groove in a top section of the resilient strip, a depth of each said side mounting layer is 0.5 mm-1 mm deeper than a depth of the mounting groove in each side section of the resilient strip.

3. A window rain guard for a vehicle, wherein the vehicle comprises a window and a resilient strip around the window, wherein the resilient strip has a mounting groove, wherein the window rain guard comprises:

a shield portion; and a mounting portion extended from said shield portion for fitting into the mounting groove of the resilient strip;

wherein said shield portion is protruded from said mounting portion to define an accommodating groove having an access opening;

wherein said shield portion comprises a distal continual edge adjacent to said access opening and a reinforcing rib which is integrally protruded from an inner side of said distal continual edge.

4. A window rain guard for a vehicle, wherein the vehicle comprises a window and a resilient strip around the window, wherein the resilient strip has a mounting groove, wherein the window rain guard comprises:

a shield portion; and a mounting portion extended from said shield portion for fitting into the mounting groove of the resilient strip;

wherein said shield portion is protruded from said mounting portion to define an accommodating groove having an access opening;

wherein said mounting portion comprises a top mounting layer and two side mounting layers extended from two sides of said top mounting layers respectively;

wherein said top mounting layer has one or more notches formed along a length thereof;

wherein the window rain guard has a proximate mounting side and a distal end side which is opposite to said proximate mounting side, wherein said one or more notches is formed at said proximate mounting side, wherein said shield portion comprises a distal continual edge adjacent to said distal end side;

wherein said shield portion comprises a reinforcing rib which is integrally protruded from an inner side of said distal continual edge.

5. The window rain guard, as recited in claim 3, wherein a width of said reinforcing rib is 2.5 mm-3 mm, a thickness of said reinforcing rib is 1.3 mm-2.3 mm.

6. The window rain guard, as recited in claim 4, wherein a width of said reinforcing rib is 2.5 mm-3 mm, a thickness of said reinforcing rib is 1.3 mm-2.3 mm, a thickness of said distal edge of said shield body is 2.2 mm-2.5 mm, a thickness of said mounting portion is 0.8 mm-1.2 mm.

7. A window rain guard for a vehicle, wherein the vehicle comprises a window and a resilient strip around the window, wherein the resilient strip has a mounting groove, wherein the window rain guard comprises:

a shield portion; and a mounting portion extended from said shield portion for fitting into the mounting groove of the resilient strip;

wherein the window rain guard has a proximate mounting side adjacent to said mounting portion and a distal end side which is opposite to said proximate mounting side and is adjacent to said shield portion, wherein said proximate mounting side is more flexible than said distal end side;

wherein said mounting portion comprises a top mounting layer and two side mounting layers extended from two sides of said top mounting layers respectively, wherein said top mounting layer has one or more notches formed along a length thereof, wherein a thickness of said mounting portion is 0.8 mm-1.2 mm, a thickness of said shield portion is 2.2 mm-2.5 mm, a main material of said shield portion and said mounting portion is polycarbonate.

8. The window rain guard, as recited in claim 7, wherein a transition portion between said top mounting layer and said side mounting layer comprises a rounded corner.

9. The window rain guard, as recited in claim 7, wherein by weight ration, a material of said shield portion and said mounting portion comprises 50%-80% polycarbonate, 10%-30% flow modifier, and 5%-15% toughening agent.

10. The window rain guard, as recited in claim 9, wherein the window rain guard is prepared by an injection molding process, wherein an injection pressure is 100 Mpa-300 Mpa, a heating temperature is 250° C.-350° C., a molding speed is 25 mm/s-100 mm/s, a cooling time is 50 s-100 s.

* * * * *